Figure 1:
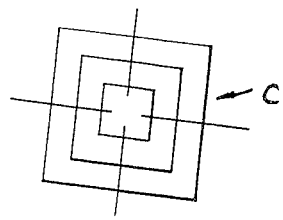

Jan. 4, 1966

J. MAILLARD 3,227,035

OPTICAL SIGHTING APPARATUS WITH COAXIAL OBJECTIVE
LENS SYSTEM AND GRID IMAGING LENS

Filed Aug. 8, 1960

2 Sheets-Sheet 1

INVENTOR.
JEAN MAILLARD
BY
Frank R. Trifari
AGENT

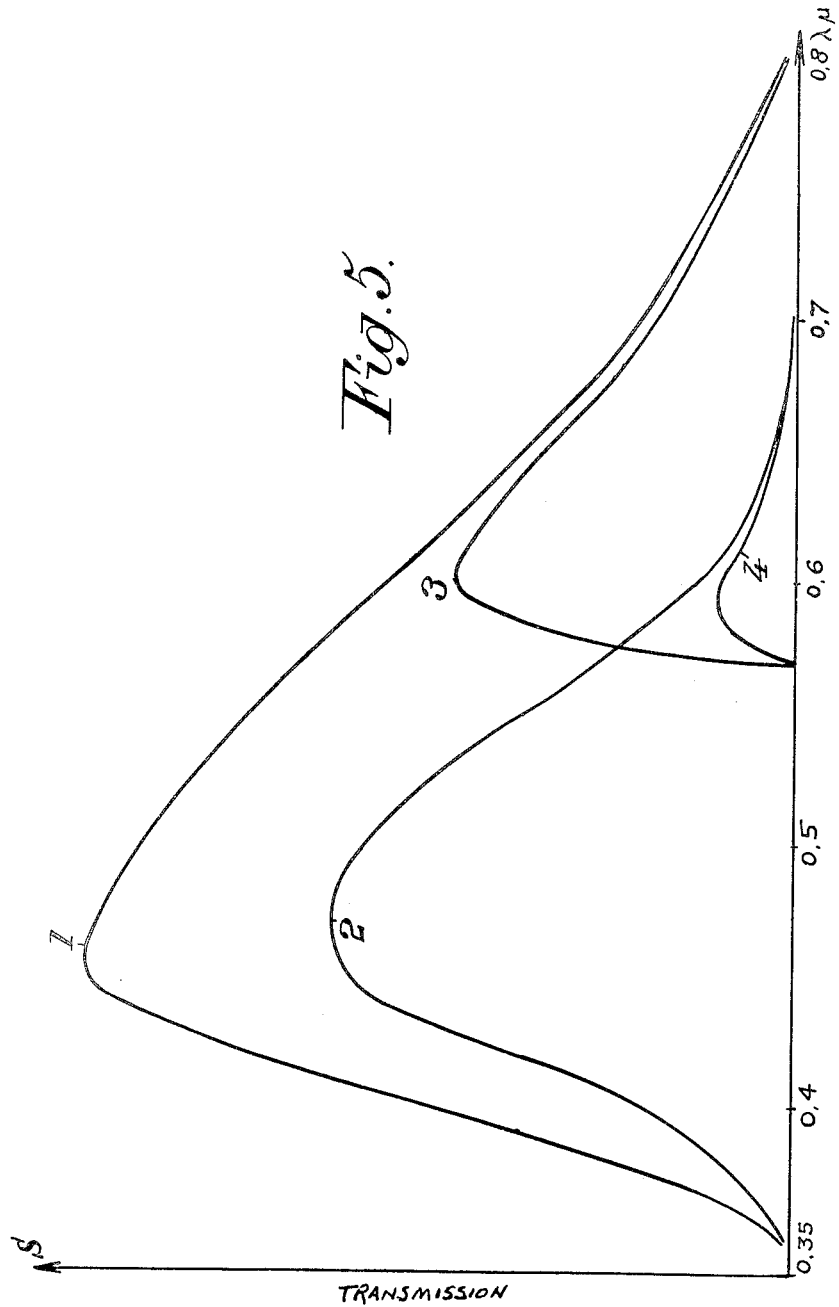

3,227,035
OPTICAL SIGHTING APPARATUS WITH COAXIAL OBJECTIVE LENS SYSTEM AND GRID IMAGING LENS
Jean Maillard, Suresnes, France, assignor to North American Philips Company, Inc., Irvington, N.Y.
Filed Aug. 8, 1960, Ser. No. 48,210
Claims priority, application France, Aug. 6, 1959, 802,198
4 Claims. (Cl. 88—2.2)

The present invention relates to optical means to facilitate sighting a scene which is at the same time to be viewed by a camera, the camera in question being preferably a television camera.

This invention is particularly, but not exclusively, concerned with means for locating and sighting a scene in association with a television camera. However, the sighting device of the invention could also be adapted to a telescope or the like.

A main object of the invention is to provide the said sighting means in such manner that sundry practical requirements are satisfied by a simple and advantageous arrangement, i.e. the arrangement envisaged provides a luminous grid and means for projecting the combined grid image and the image of the object to a screen, television camera or like apparatus.

In the present case, contrary to certain known arrangements, the image of the sighting mark is extended over the surface of the scanning means and constitutes a kind of grid on the whole of the image of the scene observed, so that all the details can be thus readily located in position. If desired, this result may be obtained by the invention without modifying the usual optical viewing system or the camera system. Additionally, a combination of filters are associated with the auxiliary optical system according to the invention, and co-operating with the sighting mark. The nature and arrangement of the filter elements relative to those of the said usual optical system, are chosen so that, while having a common optical axis, they do not substantially affect the image produced by one another.

The invention consists principally, in combination with a television camera or other optical sighting apparatus, of interposing, in the path of the light rays in said camera or apparatus, two complementary optical filters of which the second obscures only a small part of the field, and behind the first filter an observing grid and behind the second filter an optical system, obscuring similarly only a small part of the field, whereby the image of the grid is formed in the scanning plane of the camera or in the image plane of the optical observing apparatus.

It also consists, in addition to this main arrangement, in sundry other arrangements which can be used of themselves or, preferably, together and of which more explicit description will be given hereafter.

Figure 2:
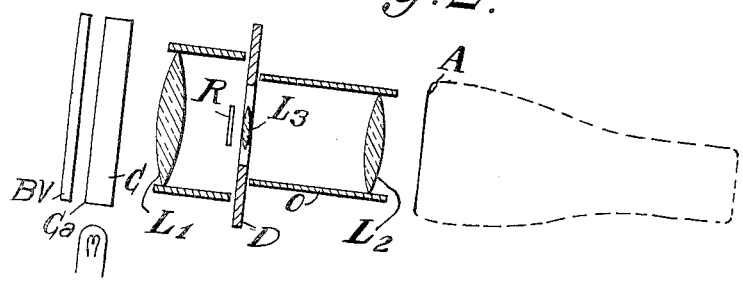
Figure 3:
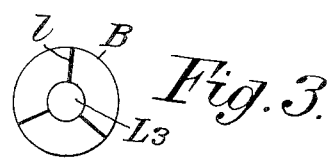
Figures 4A, 4B:
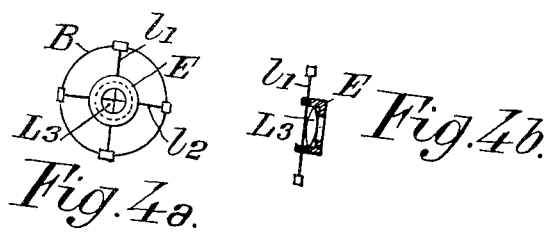

Without intending to limit the invention, it will be more particularly described by reference to the accompanying drawing which shows:

In FIGURE 1 an example of a grid;

In FIGURE 2, a schematic arrangement of a camera provided with sighting means according to the invention;

In FIGURE 3, a detail of FIGURE 2;

In FIGURE 4a is shown a variation of the arrangement according to FIGURE 3, and FIGURE 4b is a partial sectional view of FIGURE 4a;

And in FIGURE 5, curves explanatory of the action of filters suitable for use in the arrangement according to the invention.

In FIGURE 1, shown by way of example, is a form of a grid, of which the image appears superimposed on the scene to be observed.

In FIGURE 2, is shown the arrangement of a television camera for observing views with the aid of sighting means. The image of a scene to be televised, situated here for example at infinity, is formed on the scanning surface A by an objective system O comprising two lenses L1, L2. This objective system O also comprises an intermediate diaphragm D, capable of being adjusted in known manner in order to vary the luminous flux on the surface A and arranged for this purpose in a plane other than an image plane. In addition to the classical arrangement comprising the elements which have just been described (or any other equivalent arrangement), are added according to the invention:

In front of the front lens L1, an optical filter, for example a colour filter BV;

Just behind this filter, hence between this filter and the lens L1, a sheet of glass C on which is engraved, for example on the front face Ca, the grid of FIGURE 1, or any other suitable grid;

In the plane of the diaphragm D, a lens L3 of small dimensions;

In front of the lens L3, a filter complementary to the preceding filter, for example a filter R, of small dimensions.

The lens L3 is designed to give, in combination with the lenses L1 and L2, a focused image of the grid on the scanning surface A. This lens L3, similarly to the associated filter R, is one of small dimensions relative to the diameter of the diaphragm D. This lens as is shown in FIGURE 3, is mounted to assure its exact centering. Thus, lens L3 is set in a ring B, corresponding with the interior shape of the diaphragm D, which supports the lens by several thin arms or wires $l$, for example three equal arms at 120° with respect to one another. In this manner practically perfect coincidence is obtained between the optical axis of the objective system O and that of the lens L3.

According to a similar method of mounting, as shown in FIGURES 4a and 4b, the lens L3 may be supported by two extremely thin piano wires, arranged orthogonally, which are fixed diametrically to the ring B. The lens L3 is secured in a holder E provided with four holes for permitting passage of the piano wires $l_1$ and $l_2$ which cross one another in front of the lens L3, on the axis. The piano wires are not inconvenient because of their small thickness.

The filters BV and R have substantially complementary optical bands for example generally centered on blue-green and red, or any other complementary colours. In particular, the colours of the two complementary filters may be exchanged. Also it is possible to make use of crossed polarised filters.

The grid is illuminated laterally, by diffusion in the glass plate C, by lamps Z, so that a clearly visible image of the grid is obtained.

The arrangement according to the invention permits precise determination of the particulars of the scene observed, the optical sighting direction being fixed independently of the electronic scanning of the camera tube. The observer may equally profit from the arrangement in locating angles of field which, for the same reason, are independent of the scanner. The arrangement, not requiring any deviation of angle in the optical path, is mechanically very simple. It is applicable in the case of a short focal length as well as of a long focal length objective system.

The arrangement can be combined with an automatic control for the diaphragm D for regulating the peak illumination of the scanning surface A. According to the invention, by using a lens L3 of small dimensions, it is possible to obscure almost completely, a high intensity light source, such as the sun. The effect of the complementary filters BV and R is in such case favourable in complementing the action of the diaphragm, by diminishing the flux received on the surface A. Moreover, in these circumstances, the lens L3 defocusses the image of said source which is similar favourable.

Finally in FIGURE 5, efficiency curves obtained with two complementary filters actually used are traced (along the abcissa, the wavelength and along the ordinate, the transmission):

Curve 1 shows the spectral response of the associated camera tube;

The curves 2 and 3 represent the product with the coefficients of the two filters concerned;

The curve 4, the product of (1) with (2) and (3), corresponding to the central region when the two filters are in series.

The following efficiency factors may be deducted therefrom, assuming the area defined by the curve 1 and the abcissa axis to be unity:

$$S2=0.425$$
$$S3=0.24$$
$$S4=0.026$$

S2, S3, S4 being the areas defined by the curves 2, 3, 4 respectively.

What I claim is:

1. Optical sighting apparatus comprising an objective system including a first objective lens and a second objective lens coaxial with and spaced from said first objective lens, a first transparent filter member in front of said first objective lens and coaxial therewith, a coaxial sighting grid means between said first objective lens and said first filter, a second transparent filter member optically complementary to said first filter member, an optical lens adjacent said second filter on the emergent side thereof for forming an image of said sighting grid in the image plane of said objective system; said second filter and adjacent optical lens being coaxial with and located between said first objective lens and said second objective lens and of a substantially reduced radial dimension relative to the corresponding dimension of said objective system for defining a space around said second filter and adjacent optical lens passing light rays from the field view emerging from said first objective lens.

2. Optical sighting apparatus according to claim 1 with the addition of a field diaphragm and means mounting said adjacent optical lens in the plane of said diaphragm in radially spaced relation therewith for defining said annular space.

3. Optical sighting apparatus according to claim 2 wherein said adjacent optical lens is a single lens and said means mounting said lens comprises a mounting piece surrounding said lens, a pair of mutually perpendicular piano wires connected to said objective system and passing through said mounting piece, said piano wires crossing at the axis of said lens.

4. Optical sighting apparatus according to claim 2 wherein said sighting grid means is of at least the same diameter as said first objective lens for substantially encompassing the field of view of said objective system.

References Cited by the Examiner

UNITED STATES PATENTS

| | | | |
|---|---|---|---|
| 729,848 | 6/1903 | Common | 88—32 |
| 1,060,469 | 4/1913 | Mach. | |
| 2,652,748 | 9/1953 | Croy | 88—32 X |
| 2,796,800 | 6/1957 | Klemperer et al. | 88—57 X |
| 2,807,198 | 9/1957 | Resnik | 88—65 X |

FOREIGN PATENTS 27,572    1903    Great Britain.

DAVID H. RUBIN, *Primary Examiner.*

EMIL G. ANDERSON, *Examiner.*